F. FOURNIER.
CORN CUTTER.
APPLICATION FILED SEPT. 10, 1913.

1,139,856.

Patented May 18, 1915.
2 SHEETS—SHEET 1.

WITNESSES:
H. L. Opsahl.
F. C. Matheny

INVENTOR
Frank Fournier
BY
C. D. Haskins
ATTORNEY

F. FOURNIER.
CORN CUTTER.
APPLICATION FILED SEPT. 10, 1913.

1,139,856.

Patented May 18, 1915.
2 SHEETS—SHEET 2.

WITNESSES:
H. L. Opsahl.
F. C. Matheny

INVENTOR
Frank Fournier
BY
C. D. Haskins
ATTORNEY

UNITED STATES PATENT OFFICE.

FRANK FOURNIER, OF PUYALLUP, WASHINGTON.

CORN-CUTTER.

1,139,856.    Specification of Letters Patent.    Patented May 18, 1915.

Application filed September 10, 1913. Serial No. 789,208.

*To all whom it may concern:*

Be it known that I, FRANK FOURNIER, citizen of the United States, residing at Puyallup, in the county of Pierce and State of Washington, have invented a certain new and useful Improvement in Corn-Cutters, of which the following is a specification.

My invention relates to improvements in cutting machinery for corn cutters, cane cutters, and the like, and its object is to provide a rotary cutter that may be substituted for a reciprocating sickle in machines that are adapted for cutting vegetation having a thick heavy stalk. I attain this object by devices illustrated in the accompanying drawings, in which—

Figure 1:
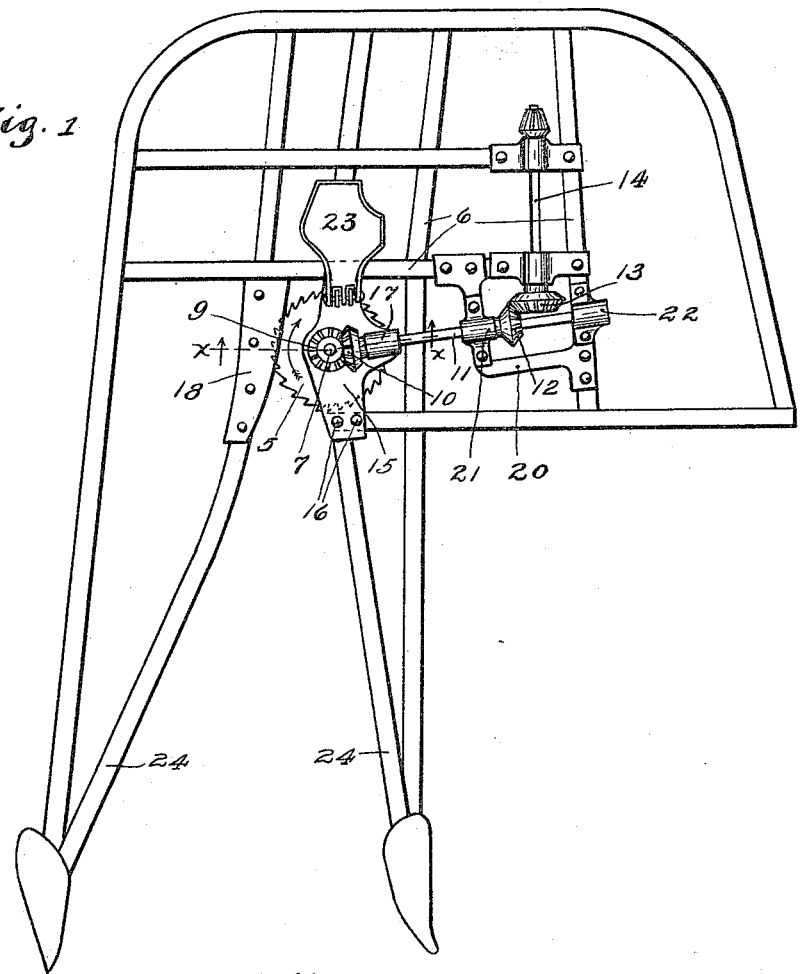
Figure 2:
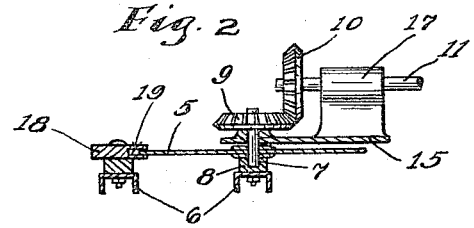
Figure 3:
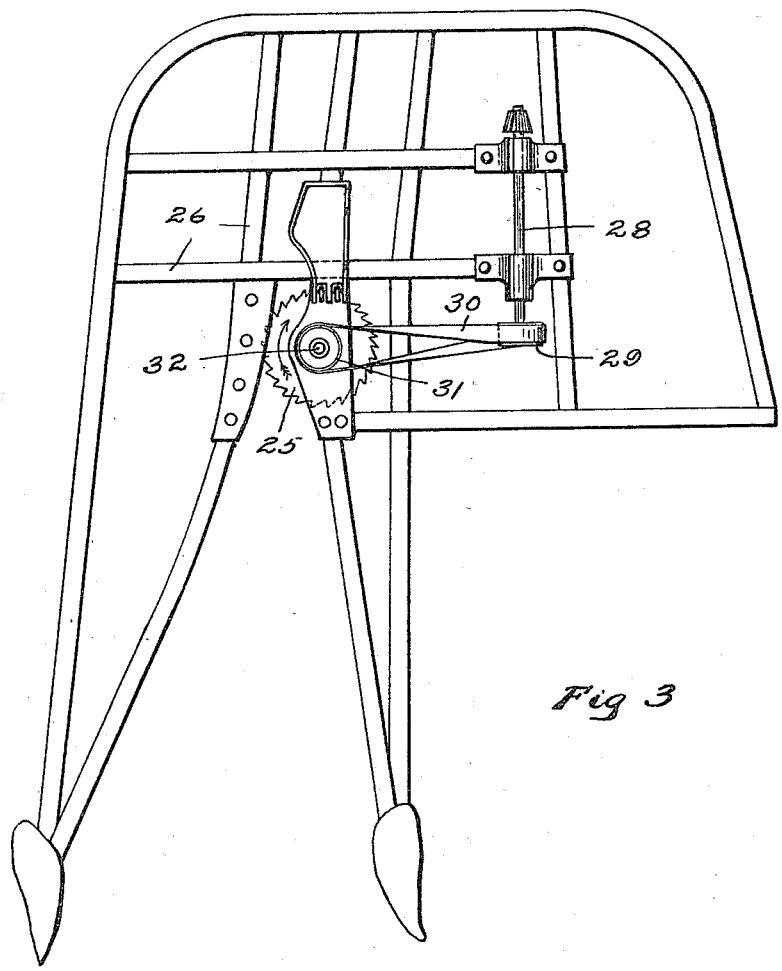

Figure 1, is a plan view of portions of a structure embodying my invention, Fig. 2 is an enlarged view in vertical section on line x, x, of Fig. 1, and Fig. 3 is a plan view of portions of a structure embodying a modified form of my invention.

In harvesting cane, corn and like vegetation it is found difficult to cut the stalks of the plant with an ordinary reciprocating sickle of a machine, especially where such stalks are of unusually large diameter, and to overcome this difficulty I have provided a rotary cutter, that is formed to have teeth like the teeth of a circular saw, which cutter may be disposed to rotate between guides or deflectors which engage with stalks of the plant to be cut as the machine travels through the field.

Like reference numerals indicate like parts throughout the drawings.

Referring to the accompanying drawings, 5 is a circular cutter provided with teeth like a saw which is rotatably mounted in suitable bearings on the base-frame 6 of an ordinary corn binder or on any like machine that is adapted to cut vegetation having large stalks, such cutter 5 being disposed so that in its revolutions it may intersect the space between the guides of said binder, within which space the stalks of vegetation are gathered to be cut by the cutter 5 as the binder is drawn through the field. The said cutter 5 is mounted securely on a vertical shaft 7 as shown more clearly in Fig. 2, which shaft 7 has its lower end journaled in a bearing 8 that is secured to the frame 6 and its upper end is provided with a bevel gearwheel 9 that is adapted to engage with a similar bevel gearwheel 10 that is secured on the end of a horizontal shaft 11 upon the other end of which is mounted another bevel gearwheel 12 which bevel gearwheel 12 is adapted to engage with and be driven by a bevel gearwheel 13 which is secured upon the end of a driving shaft 14 which is suitably journaled in bearings associated with the frame 6 and which is connected by suitable mechanical means with the driving mechanism, not shown, which driving mechanism may be any of the common well known forms used in like machines. A plate 15 is secured to the frame 6 by bolts 16 and disposed between the cutter 5 and the gear 9 to provide a bearing for the shaft 7, said plate 15 being so formed that it shall also provide a bearing 17 for the shaft 11, as shown in Fig. 1, and more clearly illustrated in Fig. 2. A plate 18, provided with a channel 19 in its inner edge within which channel 19 the periphery of the cutter 5 is adapted to rotate, is secured to the frame 6 opposite the plate 15 and a bracket 20, adapted to provide suitable bearings 21 and 22 for the shaft 11, is secured to the frame 6 adjacent to the bevel gears 12 and 13. A cover 23 may be pivotally secured to the plate 15 and normally adapted to cover the bevel gears 9 and 10 to prevent dirt, sand, vegetation and the like, from being drawn into said gear, and a similar cover, not shown, may be provided for the gears 12 and 13 if desired.

The operation of my cutter may be described as follows: The machine may be moved forward along the row of corn or other vegetation that is to be cut, the driving mechanism communicating rotary motion to the shaft 14, which rotary motion is transmitted, through the bevel gears 12 and 13, the shaft 11 and bevel gears 9 and 10, to the cutter 5 to rotate said cutter 5 in the direction indicated by the arrow in Fig. 1.

The forwardly projecting members 24, 24 of the frame 6 serve to guide the stalks of the vegetation that is to be cut as the machine is moved forward, said vegetation being engaged and severed by the rapidly revolving cutter. The vegetation then passes backwardly to other parts of the machine where it may be bound or otherwise suitably disposed of in a manner well known.

In Fig. 3 wherein I have illustrated a modified form of my invention 25 is a rotary cutter similar to the cutter 5 which is mounted to rotate in a frame 26, similar to the frame 6. The frame 26 carries a driving shaft 28 which may be actuated by any well known form of driving mechanism, not shown, and which is provided with a belt pulley 29 on its forward end, said belt pulley 29 being connected by a belt 30 with another belt pulley 31 provided on the top end of a shaft 32 on which the rotary cutter 25 is mounted thus providing simple and efficient means for driving the rotary cutter 25. My form of cutter is especially advantageous in cutting corn or sugar cane which has stalks so large that it is extremely difficult to cut them with an ordinary reciprocating sickle. Obviously other forms of driving mechanism than the ones herein illustrated and described may be used and if desired this mechanism may be driven by power communicated from a source of power that is independent from the traction mechanism of the binder as, for instance, by the power of a gasolene engine mounted upon the binder.

Manifestly changes in form of construction and arrangement of details of my device may be resorted to without departing from the spirit of my invention or sacrificing any of its advantages.

What I claim is:

In a corn cutter, the combination with a supporting frame, provided with forwardly extending divergent guides, of a rotary disk-cutter, disposed horizontally to project into the space between the rear ends of said guides and two horizontally-disposed plates secured upon the upper side of the rear portions of said guides, the confronting edges of said plates diverging to constitute continuations of said guides, one of said plates being secured to the frame over said cutter, and the other having a channel on its inner side within which said rotary cutter projects.

In witness whereof, I hereunto subscribe my name this 7th day of August A. D. 1913.

FRANK FOURNIER.

Witnesses:
F. C. Matheny,
A. Haskins.

Copies of this patent may be obtained for five cents each, by addressing the "Commissioner of Patents, Washington, D. C."